(No Model.)
L. H. COBB.
DUST PROOF BALL BEARING FOR BICYCLES.
No. 589,204. Patented Aug. 31, 1897.
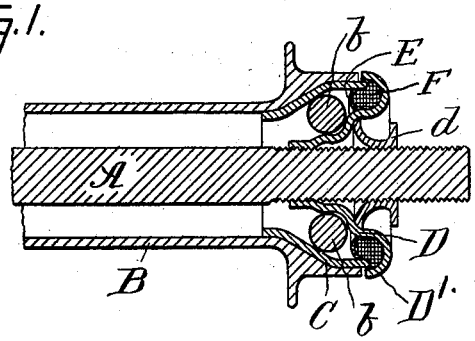
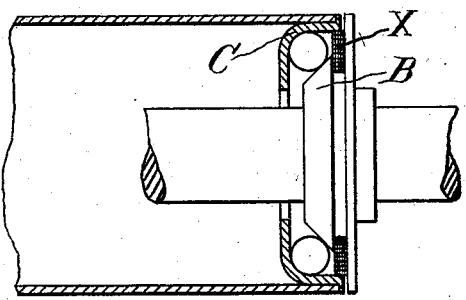
WITNESSES:
INVENTOR
ATTORNEYS.

UNITED STATES PATENT OFFICE.

LYMAN H. COBB, OF PORTLAND, MAINE, ASSIGNOR TO THE LOVELL CYCLE AND ETHER MOTOR COMPANY, OF SAME PLACE.

DUST-PROOF BALL-BEARING FOR BICYCLES.

SPECIFICATION forming part of Letters Patent No. 589,204, dated August 31, 1897.

Application filed December 9, 1896. Serial No. 615,026. (No model.)

*To all whom it may concern:*

Be it known that I, LYMAN H. COBB, of Portland, in the county of Cumberland and State of Maine, have invented an Improved Dust-Proof Ball-Bearing for Bicycles or other Vehicles, of which the following is a specification, reference being had to the accompanying drawings, in which—

Figure 1 is a section of my improved bearing. Fig. 2 is a section of the common form of a dust-proof ball-bearing.

My invention consists in the form and proportion of the parts of a ball-bearing which is arranged to form an annular chamber surrounding the bearing capable of receiving and retaining fibrous material.

In Fig. 2 is shown in section the ordinary form of ball-bearing in which dust is partially excluded from the chamber formed by the cone B and the ball-case C by means of a felt-washer X; but the effect of the washer X is only partial, for it is obvious that the natural wear of the parts must soon produce a space between the ball-case C and the washer X.

In the drawings, Fig. 1, A is the axle of the bicycle, on which the hub B turns. The hub B is provided with the usual ball-case C. The cone D is screwed onto the axle A, and, with the ball-case, forms the bearings for the balls $b$ $b$. The cone is held in place on the axle by check-nut $d$.

In my improved ball-bearing I substitute for the washer X, of felt, a mass of fibrous material, as wool, and in order to accomplish this I form the outer end of cone D into a trough shape, the outer edge of which overlaps the outer end of ball-case C. I also secure to the ball-case C a trough-shaped ring E, its concavity facing the concavity of the trough-shaped end of cone D. The inner diameter of ring E is such that it just clears ball-case C. It will now be obvious that the end of cone D and ring E form an annular chamber of the greatest possible capacity, admirably adapted to retain packing material and to prevent it from working out of place, and the outer edges D' of the cone overlapping in such a fashion as to make the entering of dust difficult.

What I claim is—

In a ball-bearing the combination of cone D having a trough-shaped base D'; a ball-case C and trough-shaped ring E, all arranged as described.

LYMAN H. COBB.

Witnesses:
LIONEL COBB,
GUY W. DAVIS.